(12) United States Patent
Kawamura et al.

(10) Patent No.: US 6,459,857 B2
(45) Date of Patent: *Oct. 1, 2002

(54) ELECTRONIC CAMERA

(75) Inventors: Tomoaki Kawamura, Kawasaki (JP);
Daiki Tsukahara, Suginami-ku (JP);
Hidefumi Ota, Toshima-ku (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,954

(22) Filed: Feb. 10, 1999

(30) Foreign Application Priority Data

Mar. 11, 1998 (JP) ............................. 10-059496
Mar. 13, 1998 (JP) ............................. 10-063349

(51) Int. Cl.[7] ............................. G03B 17/02
(52) U.S. Cl. ............... 396/374; 396/379; 396/535; 348/333.06; 348/333.09; 348/341; 348/376
(58) Field of Search .................. 348/64, 207, 341, 348/373, 376, 333.01, 333.06, 333.08, 333.09, 333.13; 396/374, 373, 378, 379, 535, 543; 358/906, 909.1

(56) References Cited

U.S. PATENT DOCUMENTS 4,420,773 A * 12/1983 Toyoda et al. ............. 348/376
4,837,817 A * 6/1989 Maemori .................... 358/906
5,801,774 A * 9/1998 Seo ........................ 348/333.01
6,141,505 A * 10/2000 Miyata et al. .............. 396/535
6,295,088 B1 * 9/2001 Tsukahara et al. ...... 348/333.06

FOREIGN PATENT DOCUMENTS

| JP | A-10-229513 | 8/1998 |
| JP | A-10-336502 | 12/1998 |
| JP | A-10-341360 | 12/1998 |

* cited by examiner

*Primary Examiner*—David M. Gray
(74) *Attorney, Agent, or Firm*—Oliff & Berridge, PLC

(57) ABSTRACT

An electronic camera includes: a substantially rectangular parallelepiped image-capturing unit main body provided with an image-capturing device for generating an image signal by capturing an optical image formed by a photographic lens unit; a substantially rectangular parallelepiped display unit main body provided with an external display device for displaying an image based upon the image signal generated by the image-capturing device; and a linking portion that links the image-capturing unit main body and the display unit main body in a manner that the image-capturing unit main body and the display unit main body can rotate relative to each other. And, at the display unit main body, a shutter release button is provided and a grip portion is provided near an end surface furthest away from the image-capturing unit main body; and at the image-capturing unit main body, an optical viewfinder unit is provided beside the photographic lens unit.

14 Claims, 10 Drawing Sheets

ELECTRONIC CAMERA

INCORPORATION BY REFERENCE

The disclosures of the following priority applications are herein incorporated by reference:

Japanese Patent Application No. 10-59496, filed Mar. 11, 1998.

Japanese Patent Application No. 10-63349, filed Mar. 13, 1998.

BACKGROUND OF THE INVENTION

1. Field of the Invention

The present invention relates to an electronic camera such as a video camera, a digital still camera or the like.

2. Description of the Related Art

In recent years, electronic cameras achieved by rotatably linking an image-capturing unit main body that generates an image by capturing the optical image of a subject and a display unit main body that displays the image thus generated have been developed. Under normal circumstances, a photographic lens and an image capture element are provided at the image-capturing unit main body of such an electronic camera. In addition, the display unit main body is provided with a liquid crystal display (LCD).

By using this electronic camera, the operator can capture an image of the subject with the photographic lens provided at the image-capturing unit main body turned in any direction freely, e.g., upward or downward as well as forward, while monitoring the image on the display screen of the LCD provided at the display unit main body. In addition, the image can be reproduced right on the spot where the image has been captured for verification.

However, since the LCD provided at the display unit main body consumes a great deal of electric power, the battery becomes depleted quickly and, as a result, there is a problem in that image capturing cannot be performed while visually checking images on the display screen on the LCD over an extended period of time.

Thus, it is desirable that an optical viewfinder be mounted at the electronic camera so that the subject can be monitored even when the LCD is turned off.

SUMMARY OF THE INVENTION

An object of the present invention is to provide an electronic camera having an optical viewfinder provided at a position that assures a high degree of efficiency, which achieves good weight balance and outstanding operability.

In order to attain the above object, an electronic camera according to the present invention comprises: a substantially rectangular parallelepiped image-capturing unit main body provided with an image-capturing device for generating an image signal by capturing an optical image formed by a photographic lens unit; a substantially rectangular parallelepiped display unit main body provided with an external display device for displaying an image based upon the image signal generated by the image-capturing device; and a linking portion that links the image-capturing unit main body and the display unit main body in a manner that the image-capturing unit main body and the display unit main body can rotate relative to each other, wherein: at the display unit main body, a shutter release button is provided and a grip portion is provided near an end surface furthest away from the image-capturing unit main body; and at the image-capturing unit main body, an optical viewfinder unit is provided beside the photographic lens unit.

In the above electronic camera, preferably: the linking portion links the image-capturing unit main body and the display unit main body so that one surface of the substantially rectangular parallelepiped image-capturing unit main body and one surface of the substantially rectangular parallelepiped display unit main body face opposite each other; and the optical viewfinder unit and the photographic lens unit are provided at the image-capturing unit main body so that optical axes of the optical viewfinder unit and the photographic lens unit are aligned in a longitudinal direction of the one surface of the image-capturing unit main body. Furthermore, preferably, a distance from a first surface of the image-capturing unit main body at which an objective window of the optical viewfinder unit is provided to a central axis of rotation and a distance from a second surface of the image-capturing unit main body at which an eyepiece window of the optical viewfinder unit is provided to the central axis are set equal to each other.

Also, preferably, individual components constituting the image-capturing unit main body and the display unit main body are positioned to ensure that a center of gravity of the electronic camera is located in the display unit main body. Furthermore, preferably: a battery chamber for housing a battery is provided at the display unit main body toward the end surface; and the photographic lens unit is provided at the image-capturing unit main body further toward the linking surface relative to the optical viewfinder unit.

Also, preferably, one or more connector terminals for connection with external apparatuses are provided at the display unit main body. In this case, one of the connector terminals for connection with external apparatuses is an external power source terminal. Preferably, among the connector terminals for connection with external apparatuses, a digital input/output terminal is provided at the end surface of the display unit main body.

Also, preferably, the image-capturing unit main body is further provided with a flash unit. Furthermore, preferably, the flash unit is provided with the optical viewfinder unit positioned between the photographic lens unit and the flash unit.

Also, preferably, the grip portion is formed in an elongated shape and is provided near the end surface along a longitudinal direction of the end surface.

Another electronic camera comprises: a substantially rectangular parallelepiped image-capturing unit main body provided with a photographic lens unit, a photographic lens unit drive device for driving back and forth at least a portion of the photographic lens unit and an image capturing device for generating an image signal by capturing an optical image formed by the photographic lens unit; a substantially rectangular parallelepiped display unit main body provided with an external display device for displaying an image based upon the image signal generated by the image-capturing device; and a linking portion that links the image-capturing unit main body and the display unit main body in a manner that the image-capturing unit main body and the display unit main body can rotate relative to each other. And the photographic lens drive device is provided at the image-capturing unit main body on a side that is distanced across the photographic lens unit from a linking surface linking the image-capturing unit main body with the display unit main body.

In this electronic camera, preferably, an optical viewfinder unit is provided at the image-capturing unit main body on the side distanced from the linking surface, beside the photographic lens unit; and the photographic lens drive device is provided in a space formed between the photographic lens unit and the optical viewfinder unit. Furthermore, preferably, the photographic lens unit is formed in a substantially cylindrical shape and the space is formed along an external circumference of the cylindrical shape.

A camera comprising: an optical unit provided with a photographic optical system that has at least a first lens group and a second lens group and forms an image of a subject, an image-capturing device that captures an image of the subject via the photographic optical system, a first drive device that drives back and forth the first lens group, a second drive device that drives back and forth the second lens group, and an optical viewfinder that forms a view field image. And, at the optical unit, the photographic optical system and the optical viewfinder are provided beside each other, and the first drive device and the second drive device are each arranged in either one of two spaces formed between the photographic optical system and the optical viewfinder in a direction intersecting a direction in which the photographic optical system and the optical viewfinder are provided beside each other.

In this camera, preferably, at the optical unit, a guide shaft for both the first lens group and the second lens group is arranged in a middle space enclosed by the photographic optical system, the viewfinder optical system, the first drive device and the second drive device.

Also, preferably, the optical unit has a first sensor for detecting a lens position of the first lens group and a second sensor for detecting a lens position of the second lens group; one of the first sensor and the second sensor is arranged in a space extending from the first drive device along a direction of lens optical axis; and another one of the second sensor and the first sensor is arranged in a space extending from the second drive device along the direction of the lens optical axis.

Also, preferably, the optical unit has: a zoom control device that varies a zoom quantity for the photographic optical system by controlling the first drive device and the second drive device; a focal point control device that varies a focal position of the photographic optical system by controlling the first drive device; and an interlocking mechanism that transmits a drive force imparted by the second drive device toward the optical viewfinder through movement of the second lens group to cause a lens of the optical viewfinder to engage in a zooming movement. Furthermore, preferably, a control resolution at the first drive device is finer than a control resolution at the second drive device. Or, preferably, the second drive device has a higher thrust and a longer stroke than the first drive device.

DESCRIPTION OF THE PREFERRED EMBODIMENT

The following is an explanation of an embodiment of the present invention given in reference to FIGS. 1~5.

Figure 1:
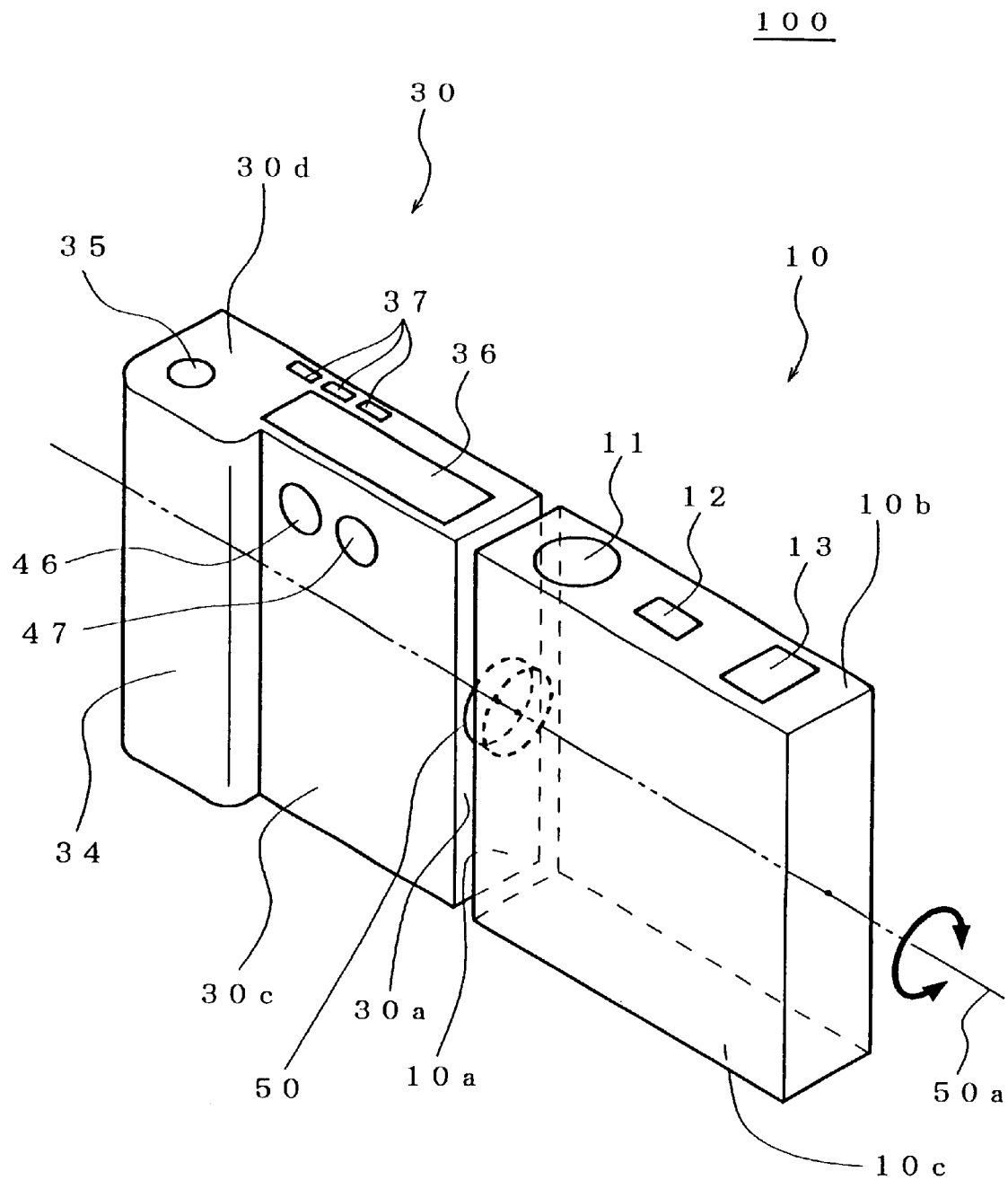
FIG. 1 is an external view of the front of an electronic camera 100 viewed diagonally from above.

An electronic camera 100 in the embodiment is constituted by linking an image-capturing unit main body that captures an optical image of a subject to generate an image and a display unit main body 30 that displays the image thus generated via a rotatable joint portion 50 as illustrated in FIG. 1 (an external view of the front viewed diagonally from above). At the rotatable joint portion 50, two cylindrical members having different diameters are fitted together in such a manner that they can rotate both in the forward and reverse directions.

Thus, the image-capturing unit main body 10 and the display unit main body 30 of the electronic camera 100 can rotate freely relative to each other around a central axis 50a of the rotatable joint portion 50. It is to be noted, however, that a stopper that restricts the ranges of the rotating angles of the image-capturing unit main body 10 and the display unit main body 30 is provided at the area of the rotatable joint portion 50 where the two members fit together (not shown). The image-capturing unit main body 10 and the display unit main body 30 both have substantially or approximately rectangular parallelepiped shapes, which are roughly identical in shape and size. In addition, the central axis of rotation 50a mentioned above passes through the centers of the image-capturing unit main body 10 and the display unit main body 30.

Consequently, when the image-capturing unit main body 10 and the display unit main body 30 are aligned together without either of them rotated at a rotating angle of 0° (see FIG. 1), a linking surface 10a of the image-capturing unit main body 10 that links with the display unit main body 30 and a linking surface 30a of the display unit main body 30 that links with the image-capturing unit main body 10 are in complete alignment with each other, so that the entire electronic camera 100 achieves a thin, substantially or roughly rectangular parallelepiped shape.

The wiring for electrically connecting the components inside the image-capturing unit main body 10 and the components inside the display unit main body 30 are inserted through hollow portions of the cylindrical members at the rotatable joint portion 50.

Next, the components provided at the image-capturing unit main body 10 and the components provided at the display unit main body 30 are explained individually.

Figure 2:
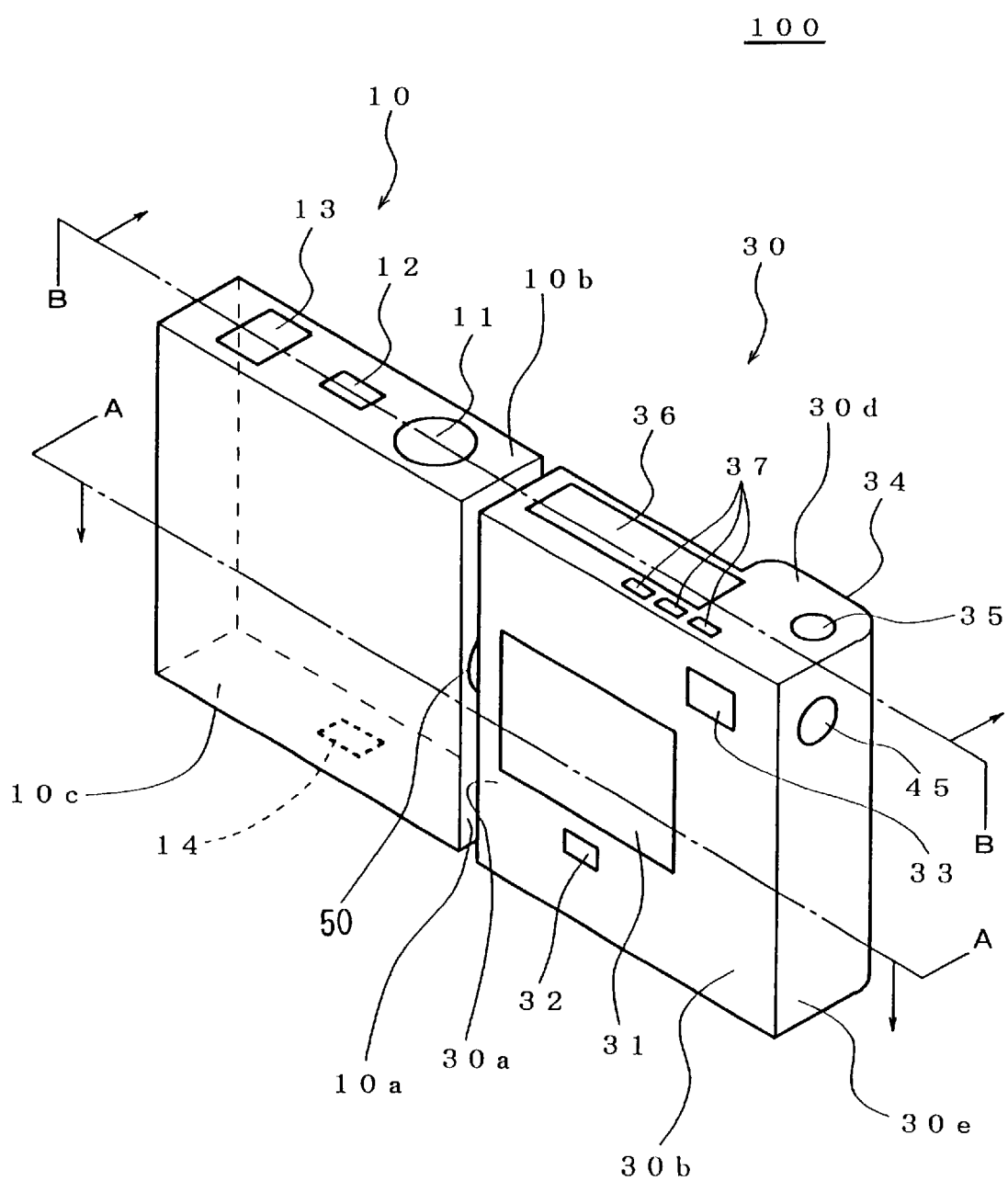
FIG. 2 is an external view of the rear of the electronic camera 100 viewed diagonally from above.

As illustrated in FIG. 2 (an external view of the rear seen from diagonally above), an LCD display window 31 for displaying images and the like is provided at a rear surface 30b of the display unit main body 30. At the rear surface 30b, a display button 32 and a zoom button 33 are provided. Inside the display unit main body 30 in the vicinity of the rear surface 30b, an LCD 41 is provided as illustrated in the sectional view (FIG. 3) viewed in the direction indicated by the arrows across line A—A in FIG. 2.

The LCD 41 is exposed to the outside through the LCD display window 31 provided at the rear surface 30b. In other words, the display screen of the LCD 41 is visible from the outside through the LCD display window 31. The LCD 41 implements display of images sent out from the image-capturing unit main body 10, reproduction of photographed images, display of setting menus for the electronic camera 100 and display of a list of functions of the electronic camera 100.

The display button 32 (FIG. 2) mentioned earlier provided at the rear surface 30b is operated to switch the display at the LCD 41 and to turn on/off the LCD. A shutter release button 35 is provided at an upper surface 30d of the display unit main body 30. At the upper surface 30d, a display window 36 of the display panel (not shown) and setting buttons 37 are provided.

The setting buttons 37 constitute a group of buttons for setting or clearing a photographing mode for the electronic camera 100. Photographing information such as the photographing mode of the electronic camera 100 set by using the setting buttons 37, the number of photographic frames and the like is displayed on a display panel (not shown), which is visible through the display window 36.

A digital input/output terminal 45 is provided at an end surface 30e of the display unit main body 30 which is at the greatest distance from the image-capturing unit main body 10. A communications cable from an outside computer is connected to the digital input/output terminal 45. In the vicinity of the end surface 30e, an elongated grip portion 34 (FIG. 1) is provided along the longitudinal direction (the direction of the longer axis) of the end surface 30e. The elongated grip portion 34 projects out at a front surface 30c of the display unit main body 30.

Figure 3:
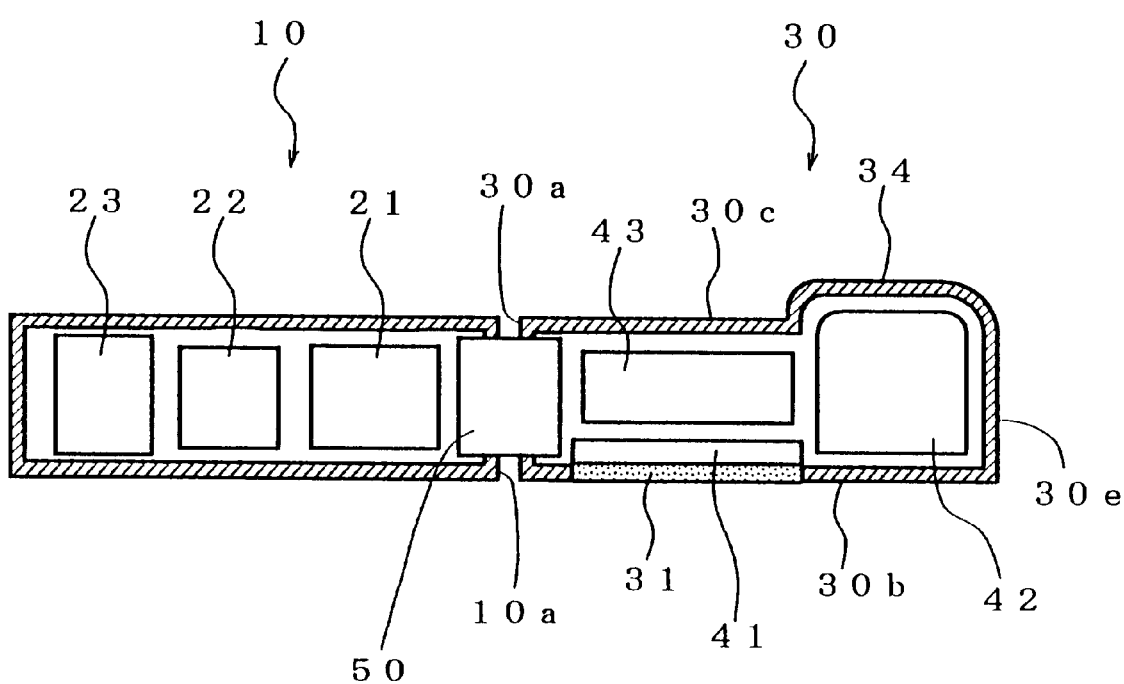
FIG. 3 is a cross section of the electronic camera 100 along line A—A in FIG. 2 viewed in the direction indicated by the arrows.

In the upper portion of the front surface 30c, a video output terminal 46 and an external power source terminal 47 are provided. A cable from a television set, which is an external apparatus, is connected to the video output terminal 46. Inside the display unit main body 30 toward the end surface 30e, a battery chamber 42 for housing a battery is located, as illustrated in FIG. 3. In addition, inside the display unit main body 30, a circuit board 43 required for image processing is provided adjacent to the LCD 41. A loading chamber for a memory card which can be attached and detached freely (not shown) is also provided inside the display unit main body 30.

Now, at an upper surface of the image-capturing unit main body 10, a photographic lens opening portion 11, a viewfinder objective window 12 and a flash light-emitting window 13 are provided sequentially in that order starting from the side where the linking surface 10a linking with the display unit main body 30 is present, as illustrated in FIG. 2. At a lower surface 10c of the image-capturing unit main body 10, a viewfinder eyepiece window 14 is provided facing opposite the viewfinder objective window 12 mentioned earlier.

Figure 4:
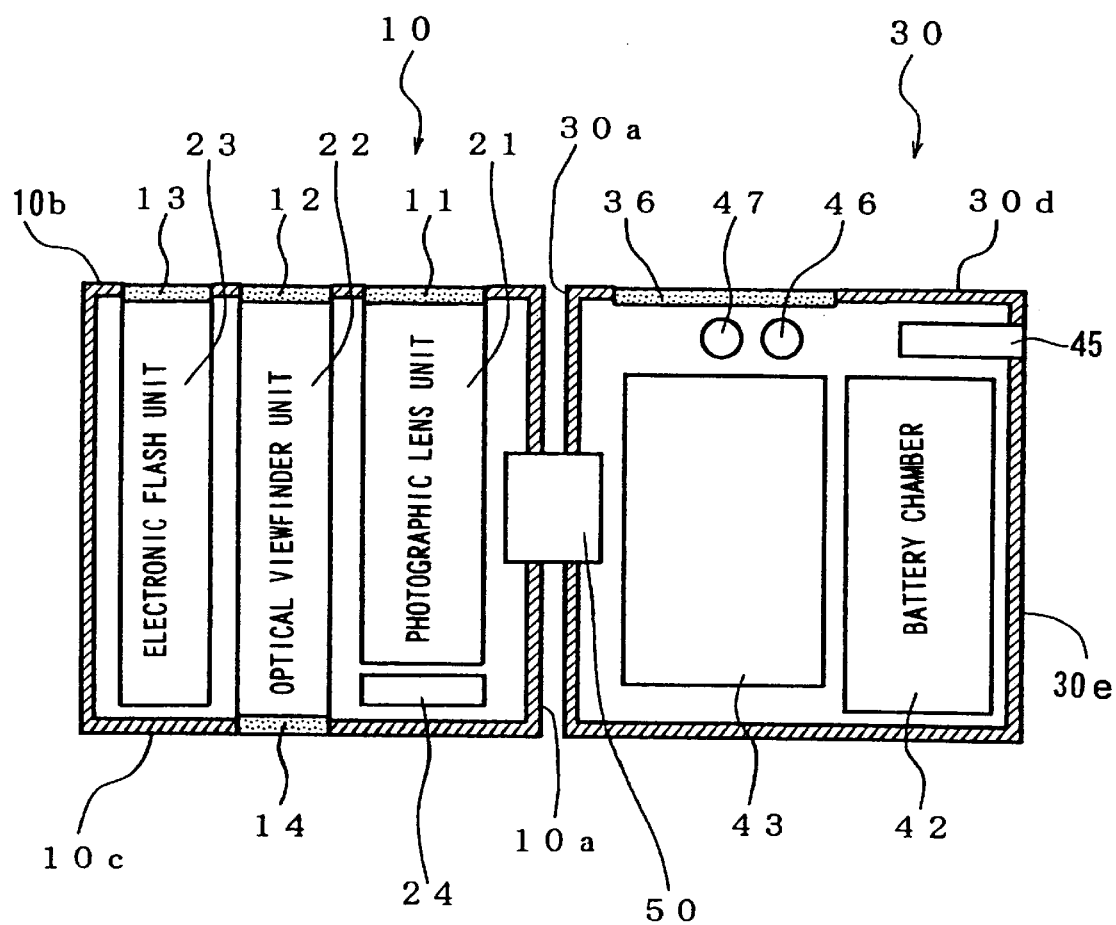
FIG. 4 is a cross section of the electronic camera 100 along line B—B in FIG. 2 viewed in the direction indicated by the arrows.

Inside the image-capturing unit main body 10, a photographic lens unit 21, an optical viewfinder unit 22 and an electronic flash unit 23 are provided sequentially in that order starting from the side where the linking surface 10a linking with the display unit main body 30 is present, as illustrated in the cross section along line B—B in FIG. 2 viewed in the direction indicated by the arrows (FIG. 4).

The photographic lens unit 21, the optical viewfinder unit 22 and the electronic flash unit 23 all have a columnar shape, with their optical axes aligned in the longitudinal direction of the linking surface 10a linking with the display unit main body 30.

Consequently, the objective-side photographic lens of the photographic lens unit 21 is exposed to the outside through the photographic lens opening portion 11 at the upper surface 10b. At the optical viewfinder unit 22, the objective side is exposed to the outside through the viewfinder objective window 12 at the upper surface 10b, whereas its eyepiece side is exposed to the outside through the viewfinder eyepiece window 14 at the lower surface 10c. The subject side of the electronic flash unit 23 is exposed to the outside through the flash light-emitting window 13 at the upper surface 10b. Specifically, the light from the electronic flash unit 23 is irradiated to the outside through the flash light-emitting window 13.

Inside the image-capturing unit main body 10 (FIG. 4), an image-capturing element 24 is provided on the image space side of the photographic lens unit 21. The photographic lens unit 21 comprises a plurality of photographic lenses for forming the optical image of the subject on the image-capturing element 24 and a control mechanism that adjusts the positions of the individual photographic lenses as necessary. By changing the positions of the photographic lenses, the optical image of the subject can be enlarged or reduced. The photographic lens positions are changed in response to instructions issued through the zoom button 33 (FIG. 2) at the display unit main body 30. While the length of the photographic lens unit 21 in the direction of the optical axis is such that it can be contained in the longitudinal direction of the image-capturing unit main body 10, as illustrated in FIG. 4, the length cannot be contained in the lateral direction (the direction of the shorter axis), i.e., the thicknesswise direction of the image-capturing unit main body 10 illustrated in FIG. 3.

The optical viewfinder unit 22 indicates to the operator the range over which photographing is possible. The electronic flash unit 23 emits flash light to the outside over a specific range through the flash light-emitting window 13 provided at the upper surface 10b.

Figure 5:
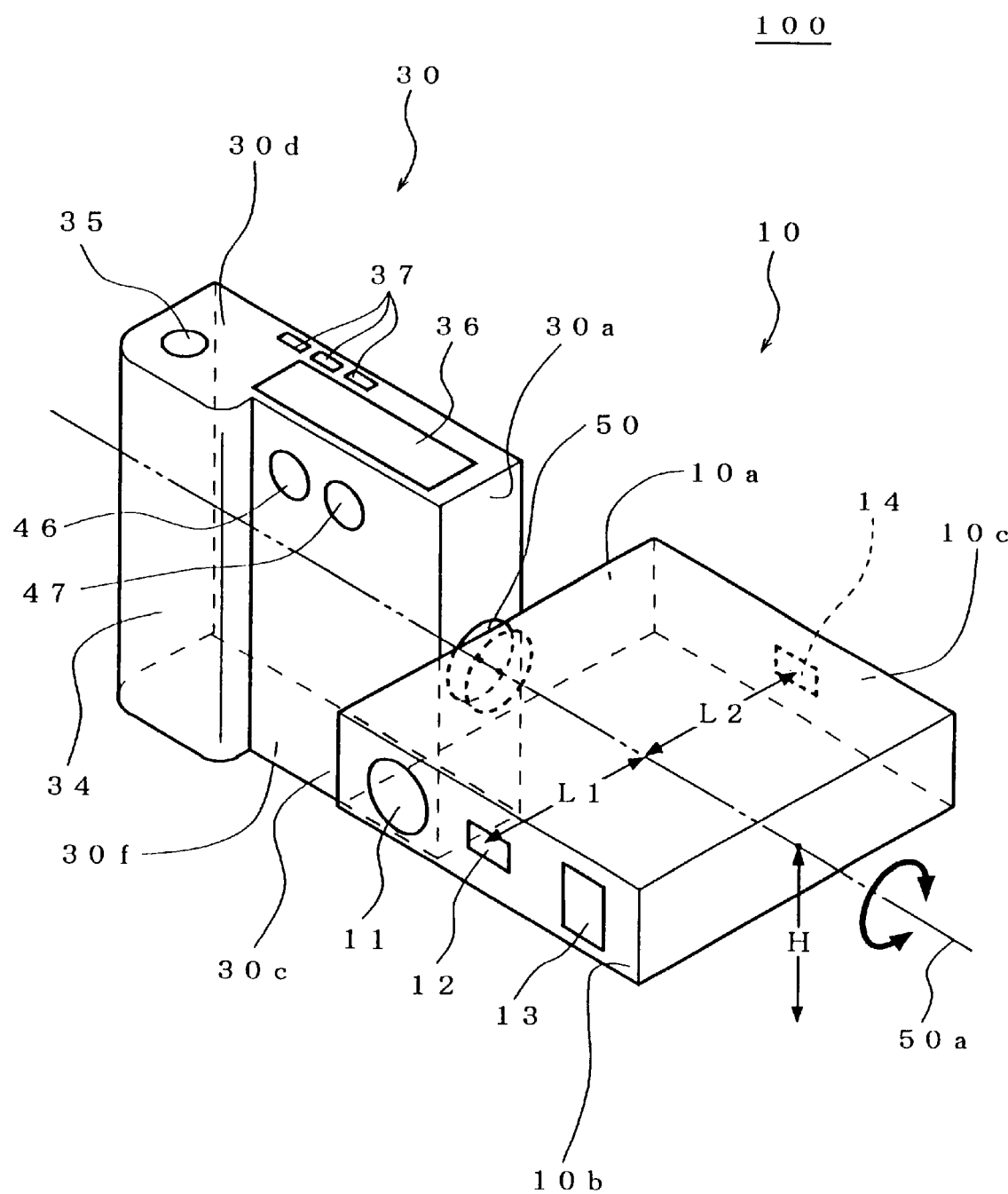
FIG. 5 is an external view illustrating the electronic camera 100 during a photographing operation.

At the electronic camera 100 structured as described above, the image-capturing unit main body 10 and the display unit main body 30 are made to rotate by a specific angle, as illustrated in FIG. 5, during a photographing 10 operation so that the photographic lens opening portion 11, the viewfinder objective window 12 and the flash light-emitting window 13 provided at the upper surface 10b of the image-capturing unit main body 10 are turned toward the subject.

As explained above, since the image-capturing unit main body 10 and the display unit main body 30 are rotatably linked via the rotatable joint portion 50 in the electronic camera 100 in the embodiment, the photographic lens opening portion 11 (the photographic lens unit 21) is positioned toward the subject for photographing by causing the image-capturing unit main body 10 to rotate relative to the display unit main body 30 regardless of the direction in which the subject is located.

Since the optical viewfinder unit 22 is provided beside the photographic lens unit 21 at the rotating image-capturing unit main body 10, the photographic view angle achieved by the photographic lens unit 21 can be observed accurately by using the optical viewfinder unit 22 for photographing regardless of the setting of the rotating angle of the image-capturing unit main body 10 relative to the display unit main body 30.

Since the electronic flash unit 23 is provided beside the photographic lens unit 21 at the rotating image-capturing unit main body 10, flash light can be accurately distributed for photographing regardless of the setting of the rotating angle of the image-capturing unit main body relative to the display unit main body 30.

Since the elongated grip portion 34 is provided at the display unit main body 30 in the electronic camera 100 in the embodiment, the operator can adjust the angle of his hand holding the elongated grip portion 34 provided at the display unit main body 30 according to the liking of the operator while maintaining it in the longitudinal direction so that a stable photographing attitude can be maintained at all times, regardless of the direction in which the image-capturing unit main body 10 (the photographic lens unit 21, the optical viewfinder unit 22) is positioned.

In particular, in a photographing operation performed while looking into the optical viewfinder unit 22, in which the face of the operator and the electronic camera 100 are placed in close proximity, the photographing operability is improved by maintaining a stable photographing attitude.

Since the central axis of rotation 50a passes through the center of the image-capturing unit main body 10 in the electronic camera 100 in the embodiment, the distance L1 from the upper surface 10b where the viewfinder objective window 12 is provided to the central axis 50a and the distance L2 from the lower surface 10c where the viewfinder eyepiece window 14 is provided to the central axis 50a are set equal to each other, as illustrated in FIG. 5.

As a result, when the image-capturing unit main body 10 is caused to rotate relative to the display unit main body 30 to position the photographic lens unit 21 toward the subject (the state illustrated in FIG. 5), the lower surface 10c at which the viewfinder eyepiece window 14 is provided is caused to project out further rearward relative to the display unit main body 30. Thus, the operator can set his eye close to the viewfinder eyepiece window 14 without getting the projecting portions of his face (such as his nose) in the way, so that he can use the viewfinder with ease.

In addition, since, in the rotated image-capturing unit main body 10, the side with the upper surface 10b projecting out further forward relative to the display unit main body 30 and the side with the lower surface 10c projecting out further rearward relative to the display unit main body 30 are almost balanced with regard to moment, the state of the rotation of the image-capturing unit main body 10 relative to the display unit main body 30 is stabilized with good balance so that the rotating angle setting of the image-capturing unit main body 10 is fixed.

As illustrated in FIG. 3, the battery chamber 42 having the largest weight inside the display unit main body 30 is located toward the end surface 30e, furthest away from the image-capturing unit main body 10, and the photographic lens unit 21 having the largest weight within the image-capturing unit main body 10 is located toward the linking surface 10a, in the electronic camera 100 in the embodiment.

Consequently, even though the optical viewfinder unit 22 and the electronic flash unit 23 are provided at the image-capturing unit main body 10, the center of gravity of the electronic camera 100 is located in the display unit main body 30. When the electronic camera 100 is placed on a table with the rotational central axis 50a extending in the horizontal direction in a state in which the image-capturing unit main body 10 is caused to rotate relative to the display unit main body 30 to position the photographic lens unit 21 toward the subject (FIG. 5), only a lower surface 30f of the display unit main body 30 is placed in contact with the upper surface of the table.

Thus, the image-capturing unit main body 10, which has been caused to rotate relative to the display unit main body 30 by a specific angle, is in a state in which it is lifted upward off the upper surface of the table by a height H. However, since the center of gravity of the electronic camera 100 is located in the display unit main body 30 as explained above, the electronic camera 100 placed on the table does not fall toward the image-capturing unit main body 10. As a result, the electronic camera 100 stands erect with good balance while the lower surface 30f of the display unit main body 30 stays in contact with the upper surface of the table.

Thus, the electronic camera 100 can be placed on a table without having to use a tripod to perform self-timer photographing in a stable manner to achieve maximum convenience in use. In addition, the electronic camera does not fall toward the image-capturing unit main body to hit the table, which may result in a shock-induced operating defect. In other words, the electronic camera 100 achieves both a function of photographing while accurately monitoring the angle of photographic view with the optical viewfinder unit 22 and a function of self-timer photographing performed on a table.

Since the battery chamber 42 (FIG. 3) having the largest weight in the display unit main body 30 is located toward the end surface 30e furthest away from the image-capturing unit main body 10, i.e., inside the elongated grip portion 34 provided at the display unit main body 30, the operator can hold the electronic camera 100 in a stable manner. Thus, the operability of the camera in his hand improves.

As illustrated in FIG. 4, the connector terminals (the digital input/output terminal 45, the video output terminal 46) for connection with external apparatuses and the external power source terminal 47 are provided at the display unit main body 30 in the electronic camera 100 in the embodiment. Consequently, when the electronic camera 100 is placed on a table, it does not fall toward the image-capturing unit main body 10 due to imbalance even if specific cables are connected to the terminals 45~47, since the weight of the connected cables works toward the display unit main body 30.

In particular, even when a communications cable mounted with a noise prevention core for electromagnetic wave prevention is connected to the digital input/output terminal 45 located at the end surface 30e of the display unit main body 30, the weight of the connected communications cable works toward the end surface 30e of the display unit main body 30 so that the camera stands erect in a stable manner without falling toward the image-capturing unit main body 10 due to imbalance.

In addition, as illustrated in FIG. 5, since the video output terminal 46 and the external power source terminal 47 are provided in the upper portion of the front surface 30c of the display unit main body 30, the operator can perform operations such as photographing and image viewing while holding the grip portion 34 of the electronic camera 100 without touching a cable from the television set connected to the video output terminal 46 or a power source cable connected to the external power source terminal 47.

Furthermore, since the photographic lens unit 21, the optical viewfinder unit 22 and the electronic flash unit 23 are provided inside the image-capturing unit main body 10 with their optical axes aligned in the longitudinal direction of the linking surface 10a which links with the display unit main body 30 in the electronic camera 100 in the embodiment (FIGS. 3 and 4), the image-capturing unit main body 10 can be formed in a thin, substantially rectangular parallelepiped shape (FIGS. 1 and 2). Consequently, the entire electronic camera 100 also achieves a thin shape. Thus, the electronic camera 100 itself can be stored in a compact manner to improve portability. Specifically, even when the length of the photographic lens unit 21 in the direction of the optical axis cannot be contained within the dimension of the electronic camera in the thicknesswise direction (the direction perpendicular to the display screen at the display unit), the entire electronic camera 100 achieves a thin shape by adopting the structure described above.

When performing a photographing operation while viewing the subject through the viewfinder eyepiece window 14, the power at the LCD 41 (FIG. 3) can be set to off through an operation performed through the display button 32 (FIG. 2) to save battery power. The photographed image can be checked through the LCD display window 31 by displaying the image with the power of the LCD 41 turned on through an operation of the display button 32.

Since the flash light-emitting window 13 is positioned away from the photographic lens opening portion 11 by a distance corresponding to the width of the viewfinder objective window 12, the likelihood of living photographic subjects such as people or animals manifesting the red-eye phenomenon can be minimized.

Since the electronic flash unit 23 is provided at an isolated position over the optical viewfinder unit 22, the likelihood of a portion of the electromagnetic wave generated at the electronic flash unit 23 entering the transmission path through which image signals are transmitted as noise to adversely affect the image is eliminated.

Since the photographic lens opening portion 11 is positioned the closest to the linking surface 10a in the image-capturing unit main body 10, the likelihood of the photographic lens opening portion 11 becoming covered by the fingers of the operator is low compared to the likelihood of the flash light-emitting window 13 and the viewfinder objective window 12 becoming covered. Thus, the photographic lens opening portion 11 is prevented from becoming soiled due to contact with fingers. In addition, photographing errors caused by the photographic lens opening portion 11 being covered by fingers can be avoided.

Since the shutter release button 35 is located at a position at the display unit main body 30 that can be easily reached by the operator holding the electronic camera 100 at the grip portion 34 by gently bending his index finger, the shutter release button 35 can be operated with a high degree of reliability even while the operator is looking into the viewfinder eyepiece window 14.

Since the zoom button 33 is located at a position that can be easily reached by the operator holding the electronic camera 100 at the grip portion 34 with his thumb, the zoom button 33 can be operated with a high degree of reliability even while he is looking into the viewfinder eyepiece window 14.

Since the setting buttons 37, which are not used during a photographing operation, are provided at positions that cannot be readily reached by any fingers when the operator is holding the electronic camera 100 at the grip portion 34, the error whereby the photographing mode of the electronic camera 100 is inadvertently changed with a finger touching a setting button during a photographing operation can be prevented.

The display window 36, too, is provided at a position that cannot be easily reached by any fingers when the operator is holding the electronic camera 100 at the grip portion 34 and, as a result, since no fingers come in contact with the display window. Thus, dirt caused by fingerprints and the like can be prevented.

By providing the mechanism for stabilizing the rotating angle of the image-capturing unit main body 10 relative to the display unit main body 30 at a desired angle at the fitting area of the rotatable joint portion 50, the rotating angle of the image-capturing unit main body 10 is fixed to reliably prevent photographing errors caused by camera vibration with hand tremble.

While the explanation is given above in reference to the embodiment by citing an example in which the present invention is adopted in a digital still camera, the present invention may be adopted in a video camera that handles motion pictures. In that case, an image-capturing button for performing operations such as a photographing start and a photographing end should be provided instead of the shutter release button 35 and the zoom button should be utilized as a switching button for switching among zoom forward, zoom back, neutral and the like. Furthermore, the present invention may be adopted in an analog electronic still camera. In other words, the present invention may be adopted in all types of electronic cameras having an image-capturing unit main body and a display unit main body rotatably linked with each other.

Optical Unit

Figure 6:
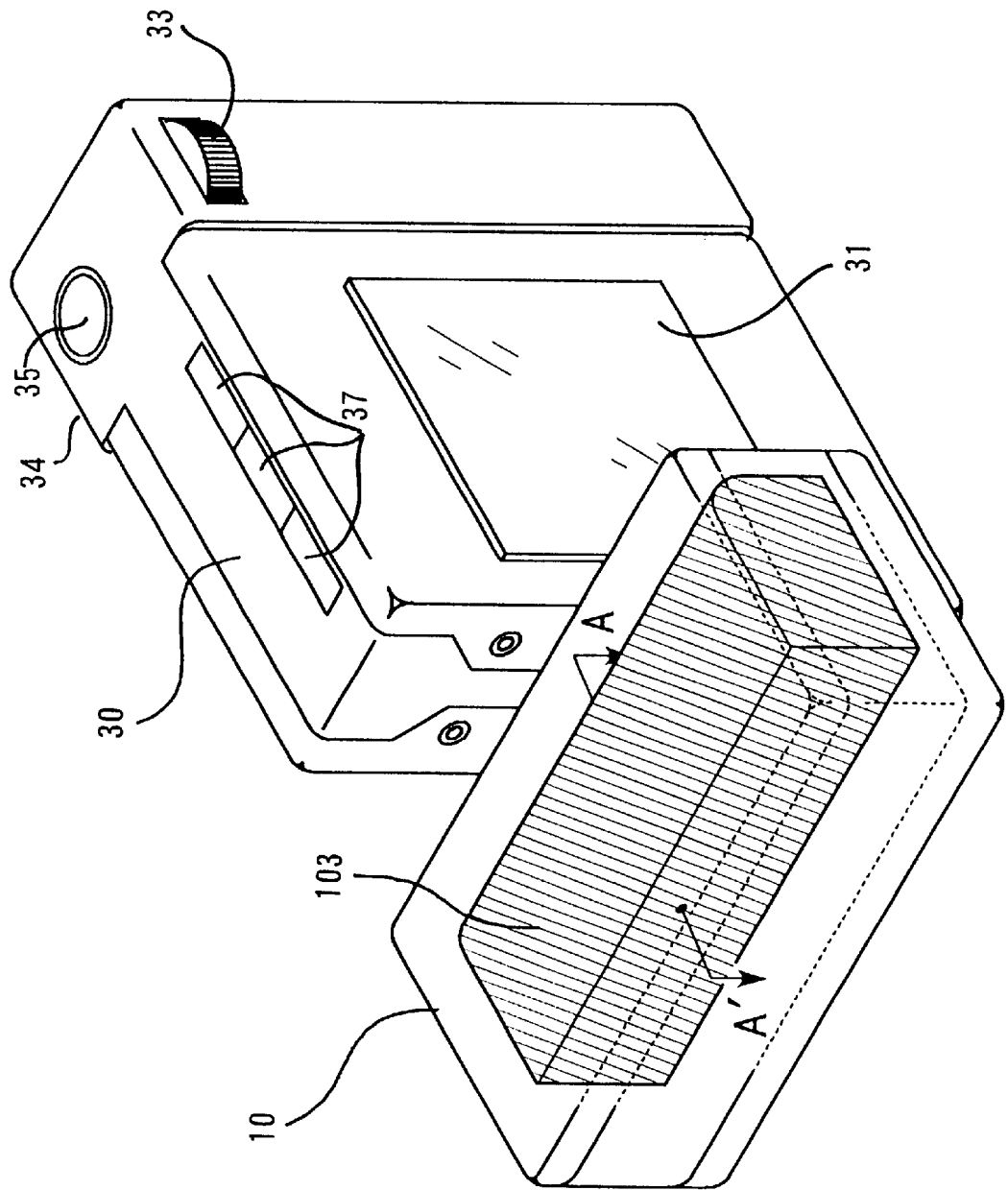
FIG. 6 is an external view of an electronic camera 100.

Next, a detailed explanation is given on an optical unit 103 (FIG. 6) comprising the photographic lens unit (photographing optical system) 21, the image-capturing element 24 and the optical viewfinder unit 22, provided inside the image-capturing unit main body 10. FIG. 6 is an external view of an electronic camera, which, while slightly different from the electronic camera 100 illustrated in FIGS. 1 and 2 in appearance, is nevertheless, an equivalent type of electronic camera. Thus, the same reference numbers are assigned to elements having identical functions to those illustrated in FIGS. 1 and 2 to preclude the necessity for repeated explanation thereof. The optical unit 103 is provided inside the image-capturing unit main body 10.

Figure 7:
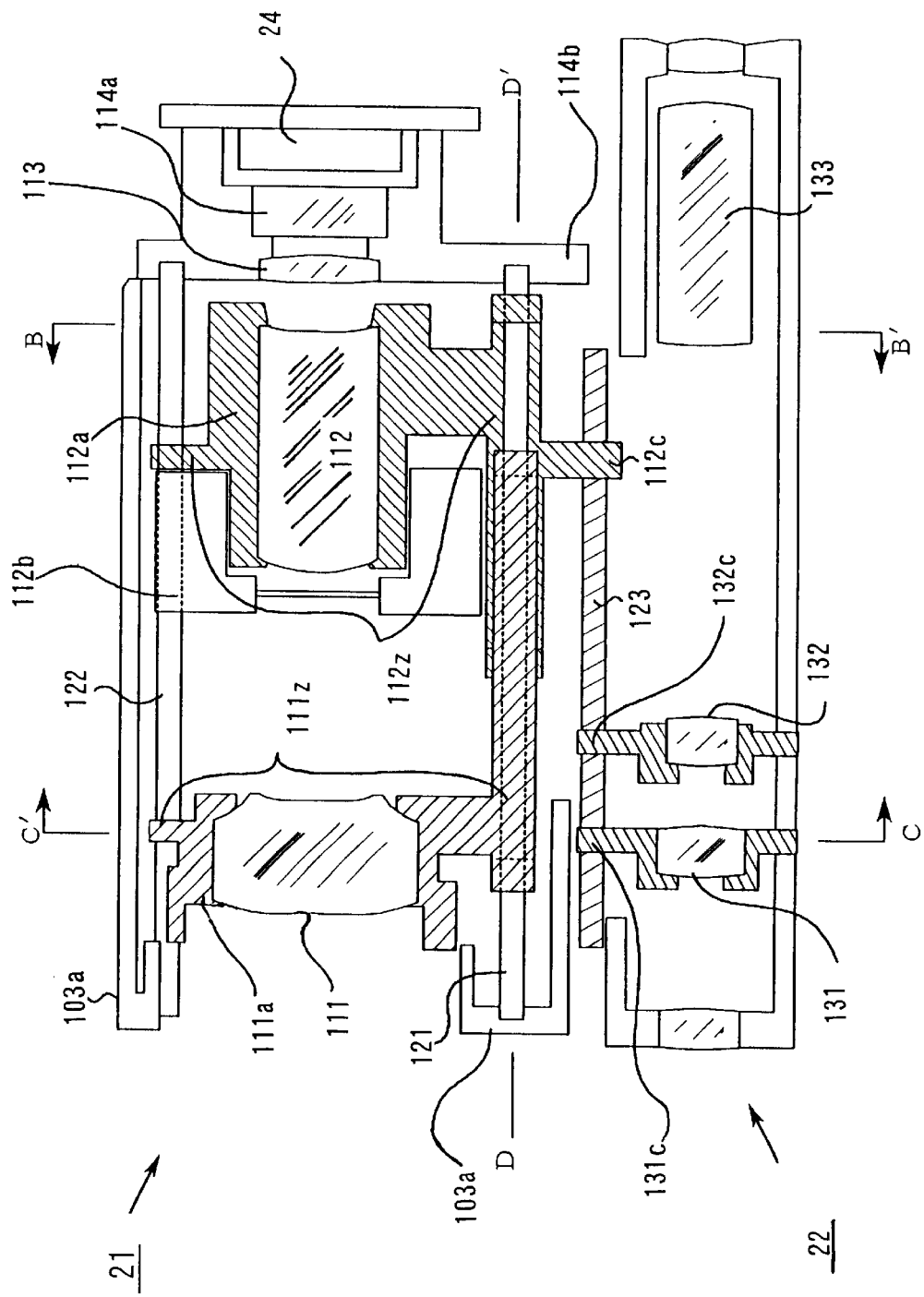
FIG. 7 is a lateral cross section of the optical unit 103 along line A—A' in FIG. 6.

FIG. 7 is a sectional view of the optical unit 103 across the lateral direction containing line A—A' in FIG. 6. In FIG. 7, the optical unit 103 is constituted by providing the photographic lens unit 21 and the optical viewfinder unit 22 beside one another laterally. At the photographic lens unit 21, a first lens group 111, a second lens group 112 and a third lens 113 are provided sequentially in this order starting from the objective side. Mainly by moving the second lens group 112 and by slightly moving the first lens group 111 for purposes of correction, the zoom power (focal length) of the photographic lens unit 21 is varied.

By driving the first lens group 111 back and forth by itself, the focal point adjustment is performed at the photographic lens unit 21. Behind the third lens 113, the image-capturing element 24 is provided via a filter 114a for cutting infrared light. The third lens 113, the filter 114a and the image-capturing element 24 are held together by a CCD holder 114b.

In the space between the photographic lens unit 21 and the optical viewfinder unit 22, a guide shaft 121 is provided. In addition, in the space between a casing 103a of the optical unit 103 and the photographic lens unit 21 (the upper side in FIG. 7), a rotation stopper shaft 122 is provided. The guide shaft 121 and the rotation stopper shaft 122 are both secured by the casing 103a at one end and by the CCD holder 114b at the other end.

The periphery of the lenses in the first lens group 111 mentioned earlier is held by a first lens chamber 111a. A holder portion 111z projects out from each side of the first lens chamber 111a. With the holder portions 111z holding the guide shaft 121 and the rotation stopper 122, the first lens group 111 is positioned at the center of the photographing light path.

The periphery of the second lens group 112 is held by a second lens chamber 112a. A holder portion 112z projects out from each side of the second lens chamber 112a. With the holder portions 112z holding the guide shaft 12 and the rotation stopper 122, the second lens group 112 is positioned at the center of the photographing light path.

Directly in front of the second lens group 112, a shutter unit 112b is provided. The shutter unit 112b, which is secured to the second lens chamber 112a, travels back and forth together with the second lens group 112.

From the holder portion 112z of the second lens chamber 112a, a follower pin 112c projects out. The follower pin 112c is fitted inside a cam groove at a cam plate 123. The cam plate 123 travels as the follower pin 112c moves back and forth. In the other two cam grooves at the cam plate 123, follower pins 131c and 132c toward the optical viewfinder unit 22 are respectively fitted. The follower pin 131c is provided projecting at a first viewfinder lens 131 of the optical viewfinder unit 22. The follower pin 132c is provided projecting at a second viewfinder lens 132 of the optical viewfinder unit 22.

The cam plate 123 structured as described above causes the first viewfinder lens 131 and the second viewfinder lens 132 to engage in a zooming movement by interlocking with the zooming movement of the second lens group 112. A prism 133 is provided to the rear of the second viewfinder lens 132. The prism 133 sets the view field image formed by the optical viewfinder unit 22 upright and guides it to the eyepiece window.

Figure 8:
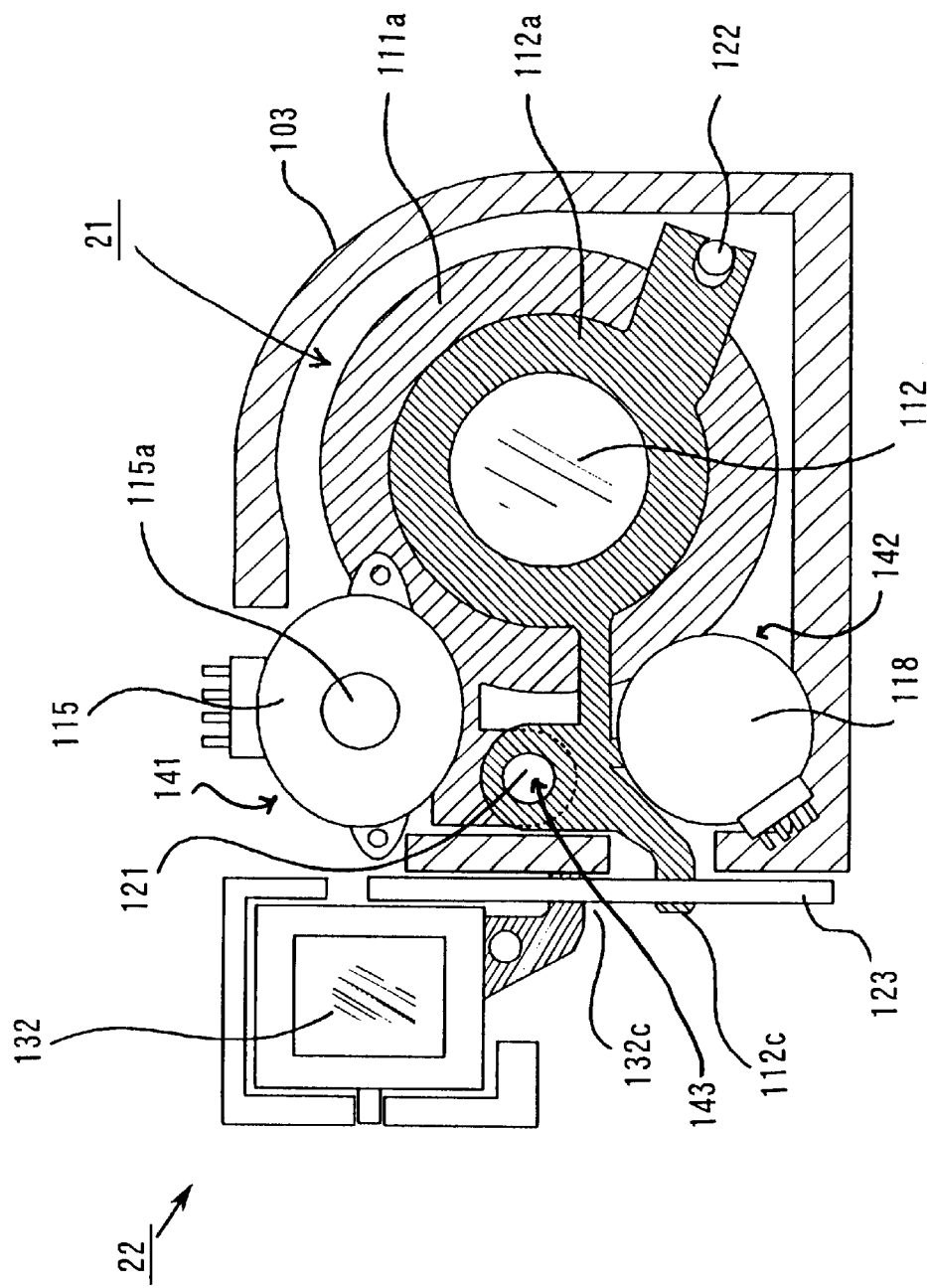
FIG. 8 is a longitudinal cross section along line B—B' in FIG. 7.
Figure 9:
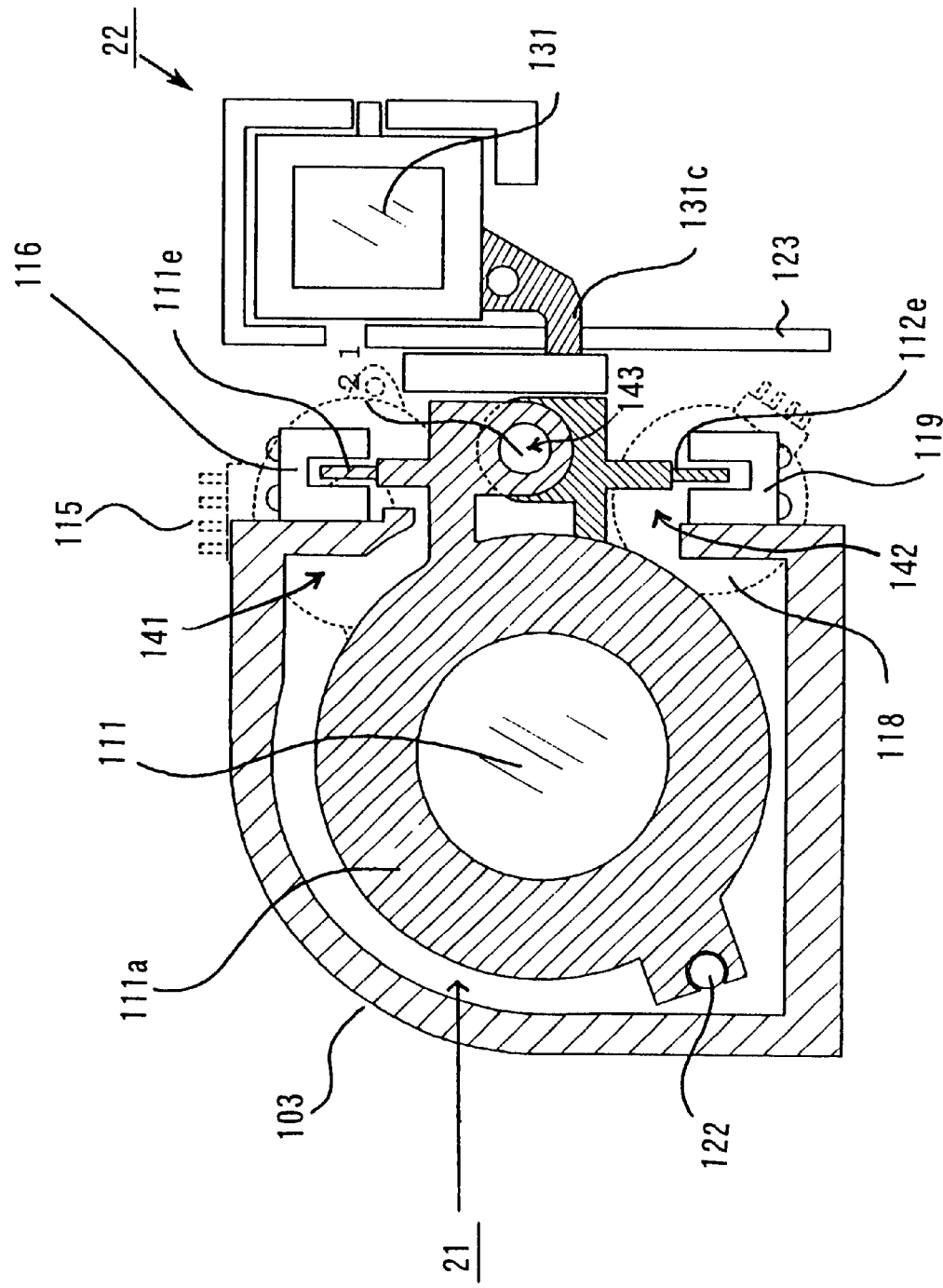
FIG. 9 is a longitudinal cross section along line C—C' in FIG. 7.

FIG. 8 is a longitudinal section along line B—B' in FIG. 7. FIG.. 9 is a longitudinal section along line C—C' in FIG. 7. As illustrated in FIGS. 8 and 9, a first motor 115 and a second motor 118 are provided in two spaces 141 and 142 respectively which are formed in a direction (the longitudinal direction in the figures) intersecting the direction (the lateral direction in the figures) in which the photographic lens unit 21 and the optical viewfinder unit 22 are provided beside each other, between the photographic lens unit 21 and the optical viewfinder unit 22. In addition, the guide shaft 121 is provided in a middle space 143 enclosed by the photographic lens unit 21, the optical viewfinder unit 22, the first motor 115 and the second motor 118.

Figure 10:
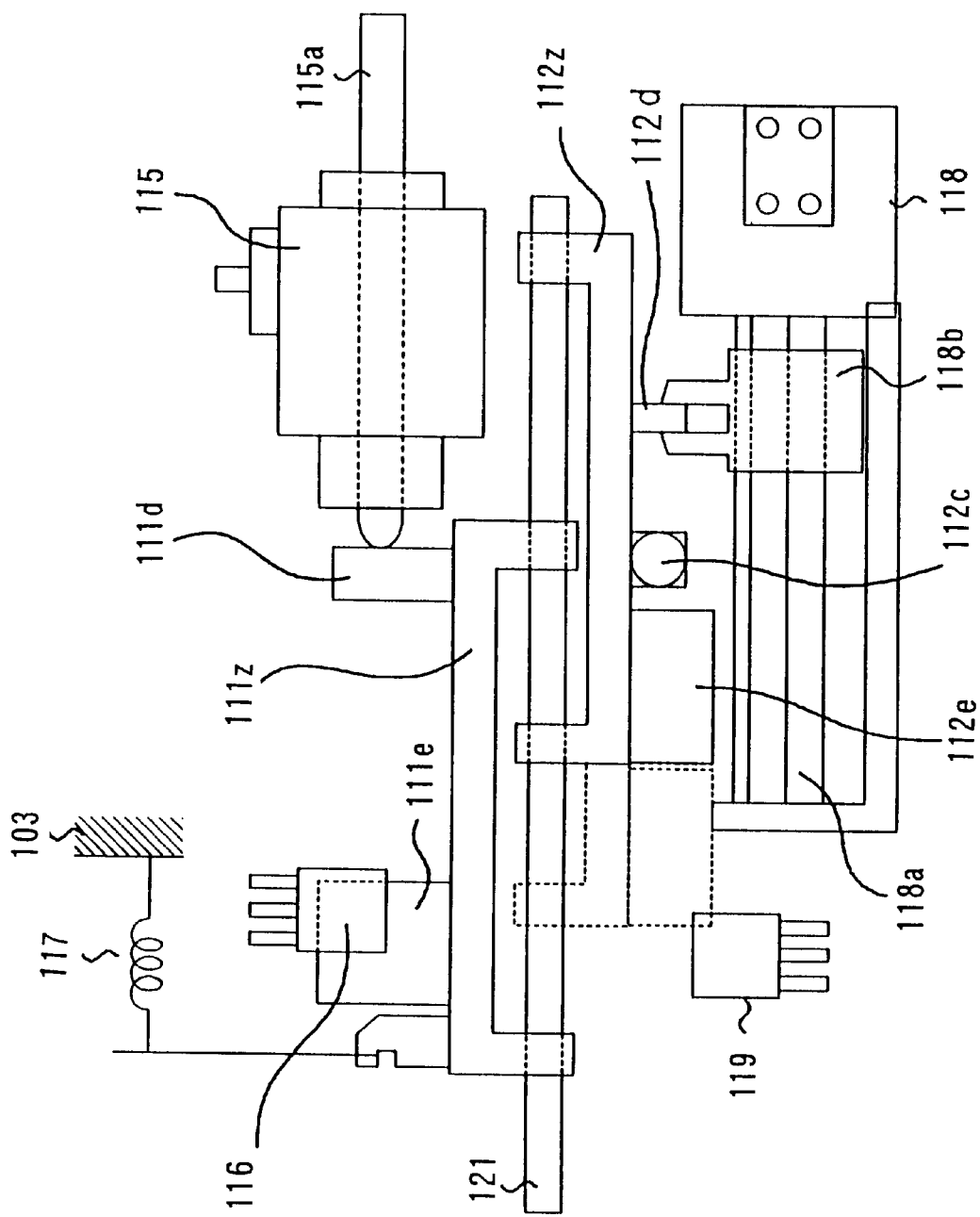
FIG. 10 is a longitudinal cross section along line D—D' in FIG. 7.

FIG. 10 is a longitudinal section along line D—D' in FIG. 7. As illustrated in FIG. 10, a holder portion 111z of the first lens chamber 111a is formed in a flat U shape to hold the guide shaft 121 at two positions. At the rear side of the holder portion 111z, a screw receptacle 111d projects. A screw 115a of the first motor 115 comes in contact with the screw receptacle 111d. At the front side of the holder portion 111z, one end of a spring 117 is secured to apply a force to the holder portion 111z to pull the first lens chamber 111a rearward.

In the front space extending along the photographic optical axis from the first motor 115, a photo-interrupter 116 is provided. A slit 111e, which projects at the holder portion 111z, passes through the photo-interrupter 116. The photo-interrupter 116 is a positional sensor for detecting the position of the origin point of the first lens group 111.

The slide mechanism for the first lens group 111 described above is set so that:

(1) stroke length . . . 7 mm;
(2) thrust . . . 50 gf; and
(3) control resolution . . . 1.5 μm.

A holder portion 112z of the second lens chamber 112a is formed in an inverted flat U shape to hold the guide shaft 121 at two positions. A rack member 118b is linked to the holder portion 112z via a linking portion 112d. The rack member 118b travels back and forth as a ball screw 118a at the second motor 118 rotates both in the forward and reverse directions. In addition, in the front space extending along the photographic optical axis from the second motor 118, a photo-interrupter 119 is provided. A slit 112e, which projects at the holder portion 112z passes through the photo-interrupter 119. The photo-interrupter 119 is a positional sensor for detecting the position of the origin point of the second lens group 112.

The slide mechanism for the second lens group 112 described above is set so that:

(1) stroke length . . . 20 mm;
(2) thrust . . . 200 gf; and
(3) control resolution . . . 10 μm.

In the structure described above, two vacant spaces 141 and 142 are formed at the optical unit between the photographic lens unit 21 and the optical viewfinder unit 22 in the direction intersecting the direction in which the units 21 and 22 are provided beside each other. The spaces 141 and 142 are formed along the round contour of the photographic lens unit 21 which is formed in a round cylindrical shape. The first motor 115 and second motor 118 are housed in these two vacant spaces 141 and 142 respectively. Thus, the first motor 115 and the second motor 118 can be housed by efficiently utilizing available space to achieve miniaturization of the optical unit 103.

Since the first motor 115 and the second motor 118 are positioned on the side that is distanced from the linking surface 10a of the image-capturing unit main body 10 across the photographic lens unit 21, the photographic lens unit 21 having the largest weight in the image-capturing unit main body 10 can be placed toward the linking surface 10a (FIG. 1). This allows the center of gravity of the electronic camera 100 to be located toward the display unit main body 30, to optimize the weight balance for the entire electronic camera 100. Furthermore, while achieving optimization of the weight balance for the entire electronic camera 100, miniaturization of the entire electronic camera 100 is achieved through miniaturization of the optical unit 103.

At the optical unit, the guide shaft 121 is provided in the middle space 143 enclosed by the photographic lens unit 21, the optical viewfinder unit 22, the first motor 115 and the second motor 118. Thus, the guide shaft 121 is housed with a high degree of efficiency in the use of space to achieve miniaturization of the optical unit 103.

By providing the guide shaft 121 in the central area in this manner, the "point of application of force imparted by the first motor 115" and the guide shaft 121 are placed in close proximity. Thus, the effect of the reactive force occurring between them is reduced, thereby making it possible to reduce the degree of deflection, dynamic frictional force and the like occurring at the first lens chamber 111a. Consequently, the first lens group 111 can be made to slide smoothly.

By providing the guide shaft 121 in the central area, the "point of application of force imparted by the second motor 118" and the guide shaft 121 are placed in close proximity. Thus, the effect of the reactive force occurring between them is reduced, thereby making it possible to reduce the degree of deflection, dynamic frictional force and the like occurring at the second lens chamber 112a. Consequently, the second lens group 112 can be made to slide smoothly.

At the optical unit in this embodiment, the photo-interrupter 116 and the photo-interrupter 119 are respectively provided in the spaces to the front of the first motor 115 and second motor 118. Consequently, the photo-interrupters 116 and 119 are housed with a high degree of efficiency in the use of space to achieve miniaturization of the optical unit 103.

In particular, by providing the photo-interrupters 116 and 119 in this manner, the photo-interrupters 116 and 119 can be provided in close proximity to the guide shaft 121. At these positions, the photo-interrupters 116 and 119 are less likely to be affected by deflection of the lens groups and the like to make it possible to improve the detection accuracy of the photo-interrupter 116 and 119.

In the optical unit in this embodiment, the drive force imparted by the second motor 118 is transmitted toward the optical viewfinder unit 22 via the follower pin 112c of the second lens chamber 112a. Consequently, a separate bypass path for transmitting the drive force to the optical viewfinder unit 22 is not required, which makes it possible to achieve miniaturization of the optical unit 103.

The three structural features, i.e., the second motor 118, the second lens chamber 112a and the optical viewfinder unit 22 are provided radially around the guide shaft 121. Thus, the drive force imparted by the second motor 118 can be transmitted to the second lens group 112 and the optical viewfinder unit 22 with a low loss and a high degree of stability.

In the optical unit, the stroke at the second motor 118 is set longer than the stroke at the first motor 115. As a result, the second lens group 112 is made to travel over a longer distance, to make it possible to further improve the zoom power of the photographic lens unit 21.

In the optical unit in this embodiment, the control resolution of the first motor 115 is set lower than the control resolution of the second motor 118. Thus, fine positioning is achieved for the focusing position of the photographic lens unit 21, to make it possible to further improve the focusing accuracy of the photographic lens unit 21.

In the optical unit, the thrust of the second motor 118 is set larger than the thrust of the first motor 115. As a result, the zooming movement of the second lens group 112 can be made at high speed, to make it possible to complete the movement of the photographic lens unit 21 within a short period of time.

As explained above, a more compact photographic lens unit which also achieves a high degree of magnifying power, focusing accuracy and high speed focusing is realized.

While an electronic camera is structured with the optical unit provided with the image-capturing element 24 in the example given above, the optical unit may be also adopted in a silver halide-type film camera by, for instance, providing a film feed mechanism for film or the like as a means for image capturing.

While the explanation is given above in reference to the optical unit with the photographic lens unit 21 having a three-group lens configuration, the present invention is not limited to this structure. Generally speaking, the details explained above may be adopted in any photographic lens unit (photographic optical system) as long as it is constituted of a lens configuration with N groups (N≧2).

What is claimed is:

1. An electronic camera comprising:
   a substantially rectangular parallelepiped image-capturing unit main body provided with an image-capturing device for generating an image signal by capturing an optical image formed by a photographic lens unit;
   a substantially rectangular parallelepiped display unit main body provided with an external display device for displaying an image based upon the image signal generated by said image-capturing device; and
   a linking portion that links said image-capturing unit main body and said display unit main body in a manner that said image-capturing unit main body and said display unit main body can rotate relative to each other, wherein:
   at said display unit main body, a shutter release button is provided and a grip portion is provided near an end surface furthest away from said image-capturing unit main body; and
   at said image-capturing unit main body, an optical viewfinder unit is provided beside said photographic lens unit so that optical axes of said optical viewfinder unit and said photographic lens unit are aligned in one direction.

2. An electronic camera according to claim 1, wherein:
   said linking portion links said image-capturing unit main body and said display unit main body so that one surface of said substantially rectangular parallelepiped image-capturing unit main body and one surface of said substantially rectangular parallelepiped display unit main body face opposite each other; and
   said optical viewfinder unit and said photographic lens unit are provided at said image-capturing unit main body so that the optical axes of said optical viewfinder unit and said photographic lens unit are aligned in a longitudinal direction of said one surface of said image-capturing unit main body.

3. An electronic camera according to claim 2, wherein:
   a distance from a first surface of said image-capturing unit main body at which an objective window of said optical viewfinder unit is provided to a central axis of rotation and a distance from a second surface of said image-capturing unit main body at which an eyepiece window of said optical viewfinder unit is provided to said central axis are set equal to each other.

4. An electronic camera according to claim 1, wherein:
   individual components constituting said image-capturing unit main body and said display unit main body are positioned to ensure that a center of gravity of said electronic camera is located in said display unit main body.

5. An electronic camera according to claim 4, wherein: a battery chamber for housing a battery is provided at said display unit main body toward said end surface; and
   said photographic lens unit is provided at said image-capturing unit main body further toward a linking surface of said image-capturing unit relative to said optical viewfinder unit, said linking surface being connected with said linking portion.

6. An electronic camera according to claim 1, wherein:
   one or more connector terminals for connection with external apparatuses are provided at said display unit main body.

7. An electronic camera according to claim 6, wherein:
   one of said connector terminals for connection with external apparatuses is an external power source terminal.

8. An electronic camera according to claim 6, wherein:
   among said connector terminals for connection with external apparatuses, a digital input/output terminal is provided at said end surface of said display unit main body.

9. An electronic camera according to claim 1, wherein:
   said image-capturing unit main body is further provided with a flash unit.

10. An electronic camera according to claim 9, wherein:
said flash unit is provided with said optical viewfinder unit positioned between said photographic lens unit and said flash unit.

11. An electronic camera according to claim 1, wherein:
said grip portion is formed in an elongated shape and is provided near said end surface along a longitudinal direction of said end surface.

12. An electronic camera comprising:
a substantially rectangular parallelepiped image-capturing unit main body provided with a photographic lens unit, a photographic lens unit drive device for driving back and forth at least a portion of said photographic lens unit and an image-capturing device for generating an image signal by capturing an optical image formed by said photographic lens unit;
a substantially rectangular parallelepiped display unit main body provided with an external display device for displaying an image based upon the image signal generated by said image-capturing device; and
a linking portion that links said image-capturing unit main body and said display unit main body in a manner that said image-capturing unit main body and said display unit main body can rotate relative to each other, wherein:
said photographic lens unit drive device is provided at said image-capturing unit main body on a side that is distanced across said photographic lens unit from a linking surface linking said image-capturing unit main body with said display unit main body so that said linking surface, said photographic lens unit and said photographic lens unit drive device are arranged in order of said linking surface, said photographic lens unit and said photographic lens unit drive device.

13. An electronic camera according to claim 12, wherein:
an optical viewfinder unit is provided at said image-capturing unit main body on the side distanced from said linking surface, beside said photographic lens unit; and
said photographic lens unit drive device is provided in a space formed between said photographic lens unit and said optical viewfinder unit.

14. An electronic camera according to claim 13, wherein:
said photographic lens unit is formed in a substantially cylindrical shape and said space is formed along an external circumference of the cylindrical shape.

* * * * *